(12) United States Patent
Fu et al.

(10) Patent No.: US 9,403,226 B2
(45) Date of Patent: Aug. 2, 2016

(54) CHAIN SAW

(71) Applicant: Chervon (HK) Limited, Wanchai (HK)

(72) Inventors: Huixing Fu, Nanjing (CN); Fangjie Nie, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 118 days.

(21) Appl. No.: 14/033,967

(22) Filed: Sep. 23, 2013

(65) Prior Publication Data

US 2014/0283395 A1    Sep. 25, 2014

(30) Foreign Application Priority Data

Mar. 22, 2013  (CN) .......................... 2013 1 0095795
Mar. 22, 2013  (CN) .......................... 2013 1 0096230

(51) Int. Cl.
  *B27B 17/12*    (2006.01)
  *B23D 57/02*    (2006.01)
  *B23D 59/04*    (2006.01)

(52) U.S. Cl.
  CPC .............. *B23D 57/023* (2013.01); *B27B 17/12* (2013.01); *B23D 59/04* (2013.01)

(58) Field of Classification Search
  CPC .... Y10T 83/263; B27B 17/12; B23D 27/023; B23D 57/02; B26D 7/08
  USPC .................. 30/381–386, 122–123.4
  See application file for complete search history.

(56) References Cited

U.S. PATENT DOCUMENTS

| 3,964,333 A * | 6/1976 | Hirschkoff ...................... 30/381 |
| 4,644,658 A | 2/1987 | Dolata et al. |
| 5,184,403 A * | 2/1993 | Schliemann ................. 30/123.4 |
| 5,709,032 A | 1/1998 | Mizutani |
| 5,915,795 A * | 6/1999 | Nakamura et al. .............. 30/382 |
| 7,182,059 B2 * | 2/2007 | Kawamura .............. B27B 17/12 123/196 R |
| 2011/0132165 A1 | 6/2011 | Dale |

FOREIGN PATENT DOCUMENTS

| DE | 3320761 | 12/1984 | |
| DE | 3320761 A1 * | 12/1984 | .............. B27B 17/12 |
| DE | 29519574 | 4/1997 | |
| GB | 2403928 | 1/2005 | |

OTHER PUBLICATIONS

Canadian Intellectual Property Office, Office Action regarding CA 2,828,565, 6 pgs.

* cited by examiner

*Primary Examiner* — Ghassem Alie
*Assistant Examiner* — Nhat Chieu Do
(74) *Attorney, Agent, or Firm* — Greenberg Traurig, LLP

(57) ABSTRACT

A chain saw includes a housing, an oil supply system disposed in the housing, a trigger linkage assembly, and a switch controlled by the trigger linkage assembly. The oil supply system includes an oil can and an oil pump assembly connected with the oil can via an oil inlet tube. The trigger linkage assembly includes a switch trigger. The chain saw further includes a pressing member driven by the trigger linkage assembly. When the switch trigger is not activated, the pressing member is located at a first position and can press the oil inlet tube tightly to isolate an oil circuit of the oil supply system. When the switch trigger is pressed down, the pressing member can be driven by the trigger linkage assembly to a second position to release the pressing for the oil inlet tube so that the oil circuit of the oil supply system is allowed to flow.

15 Claims, 5 Drawing Sheets

CHAIN SAW

RELATED APPLICATION INFORMATION

This application claims the benefit of CN 201310095795.4, filed on Mar. 22, 2013, and CN 201310096230.8, filed on Mar. 22, 2013, the disclosures of which are incorporated herein by reference in their entirety.

FIELD OF THE DISCLOSURE

The present disclosure relates to gardening electrical power tools and, more particularly, to a chain saw.

BACKGROUND

A chain saw, as a gardening electrical power tool, is extensively used in household, gardening, and like fields. A working principle of the chain saw is that a powering device drives a transmission mechanism which in turn drives the saw chain to cut. During operation, a large amount of heat is generated due to friction between the saw chain and other elements; therefore lubrication needs to be performed timely to prevent damage to the saw chain due to quick rises in temperature. Hence, an oil supply system is generally disposed in a housing of the chain saw and includes an oil tank for storing the lubricant and an oil pump connected with the oil tank. The oil tank delivers the lubricant to the oil pump via an oil pipe, and the oil pump is adjacent to the chain and supplies the lubricant to the saw chain to lubricate the chain.

The above oil supply system has the oil pump as a kernel assembly. Oil leakage of the oil pump body is a crucial factor affecting stability of the oil supply system of the chain saw product. The oil supply systems of many chain saws available in the market will be confronted with oil leakage during use and storage of the machine, thereby causing problems such as undesirable lubrication effect of the machine, waste of resources and environmental pollution.

In addition, after a user fills the lubricant to the full and uses the chain saw for a period of time, the chain saw usually is placed for a period of time and then continues to be used. During placement of the machine, the lubricant is often stored in an oil can. If it is not properly sealed, the lubrication often leaks out of the machine, which causes waste of resources and environmental pollution and affects hygienic conditions upon use of the machine. In current chain saw products, a bolt is used to tightly press an oil outlet pipe to interrupt an oil circuit. Generally, there are two methods for adjusting the bolt. One is to adjust the bolt via an external tool. As this method requires use of other tools this method causes much inconvenience. The other is to adjust the bolt via used of an adjusting accessory without using other external tools, for example, to adjust the bolt by use of a regulating knob at a top end of the bolt. However, both of the above two methods require the user to perform additional steps associated with specifically operating the bolt so the chain saw is not conveniently or quickly usable. On the other hand, if the user forgets to press the bolt tightly, oil leakage will occur.

SUMMARY

In view of the above content, the following describes a chain saw which may effectively prevent oil leakage during storage of the chain saw.

To achieve the above object, the subject chain saw includes a housing, a saw chain, an oil supply system disposed in the housing which includes an oil can and an oil pump assembly for supplying oil to the saw chain connected with the oil can via an oil inlet tube, a switch, a trigger linkage assembly mounted in the housing for controlling the switch. The trigger linkage assembly includes a switch trigger and a trigger linkage rod driven by the switch trigger and a torsion spring disposed on a pivot point of the trigger linkage rod. The trigger linkage rod is rotatable relative to the housing. The switch trigger is capable of triggering the switch via the trigger linkage rod, and the trigger linkage rod is biased by the torsion spring in a direction away from the direction of triggering the switch. The chain saw further includes a pressing member positioned on the trigger linkage rod. The pressing surface is formed on one side of the pressing member facing towards the oil inlet tube and is capable of pressing a predetermined position on the oil inlet tube when the switch trigger is not triggered. The pressing member is thus located at a first position to isolate an oil circuit of the oil supply system, and when the switch trigger is pressed down, the pressing member is driven by the trigger linkage assembly to a second position, so that the oil circuit of the oil supply system allows oil flow.

As will become apparent, isolation and communication of an oil circuit of the chain saw oil supply system is achieved by the pressing member driven by the trigger linkage assembly, without requiring a user to perform additional operations. The chain saw is convenient in use, temporally divided into two phases, namely a use phase and a storage phase, to perform on and off control to the oil circuit, desirably solving the oil leakage problem during storage of the chain saw and meanwhile not affecting the oil feeding effect upon use of the machine.

DETAILED DESCRIPTION OF PREFERRED EMBODIMENTS

Figure 1:
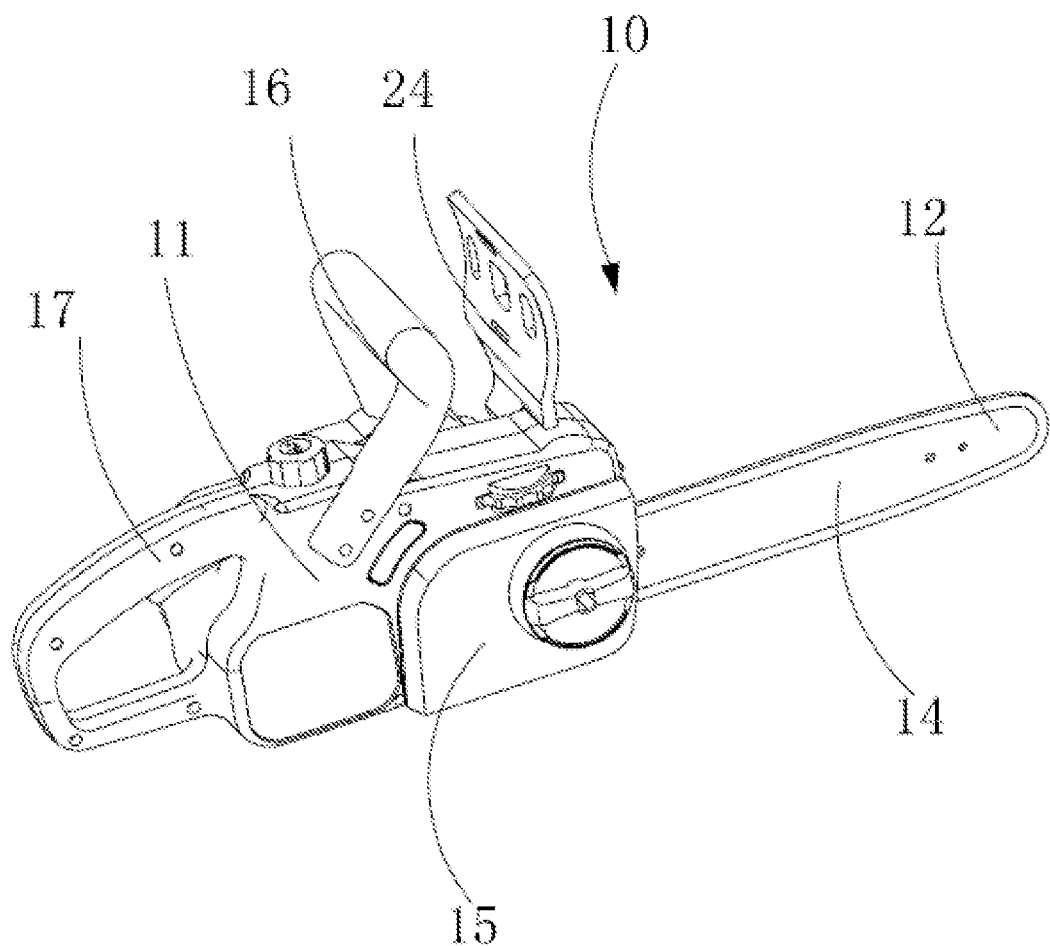
FIG. 1 is an isometric view of an exemplary chain saw constructed according to the description which follows.
Figure 2:
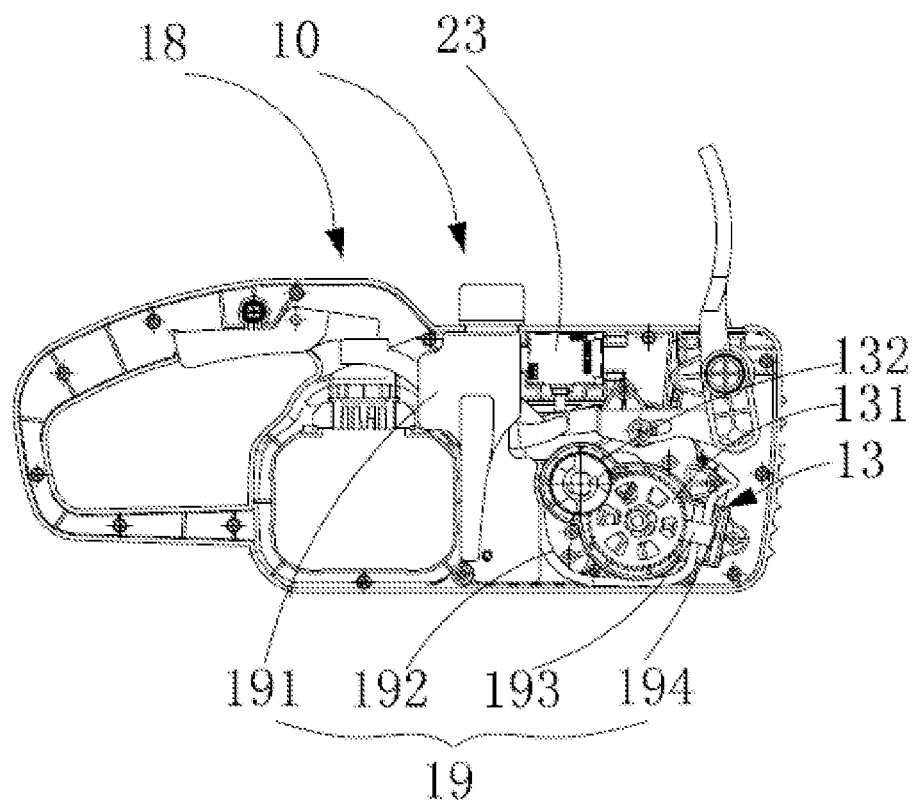
FIG. 2 is a sectional view of the chain saw of FIG. 1.

Referring to FIGS. 1 and 2, a chain saw 10 according to an exemplary embodiment includes a housing 11, a saw chain 12, a motor, a transmission mechanism 13, a guide bar 14, a cover plate 15, a front handle 16 and a main handle 17 provided on the housing 11, a trigger linkage assembly 18, an oil supply system 19 for lubricating the saw chain 12, and a switch 23 controlled by the trigger linkage assembly 18. The transmission mechanism 13 includes a gear assembly 131 driven by the motor and a sprocket 132 which is brought by the gear assembly 131 into rotation. Teeth of the sprocket 132 mesh with the saw chain 12, and the saw chain 12 surrounds an edge of the guide bar 14 and is cyclically guided by the guide bar 14. An end of the guide bar 14 is supported on the housing 11, and the other end extends out of the housing 11 in a longitudinal direction of the housing 11. Those having ordinary skill in the art appreciate that specific structure of the front handle 16, the main handle 17, the transmission mechanism 13 and the guide bar 14 and control of the motor by the switch 23 all belong to common knowledge and will not be described in detail here.

Figure 3:
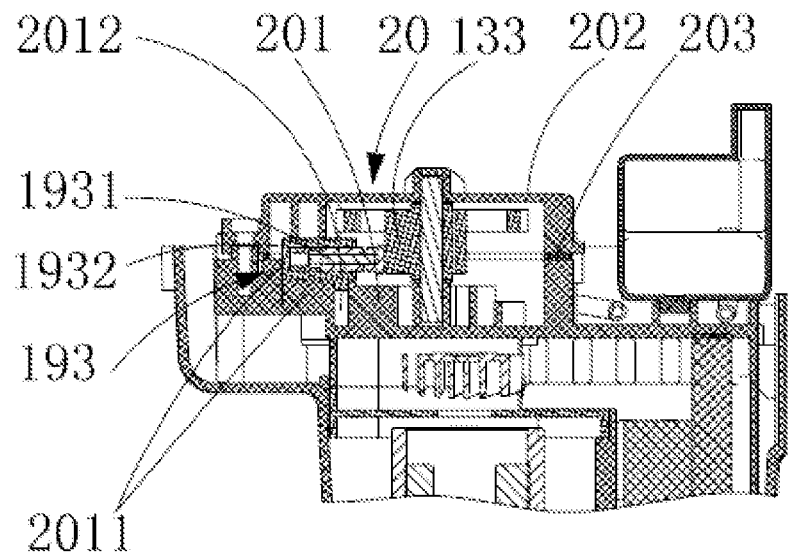
FIG. 3 is a partial, sectional view of the chain saw of FIG. 1.

Referring to FIGS. 2 and 3, the oil supply system 19 includes an oil can 191 for storing machine oil, an oil inlet tube 192 directly connected to the oil can 191, an oil pump assembly 193 and an oil outlet tube 194. A motor shaft is provided an eccentric wheel 133 thereon coaxially rotatable along with the gear assembly 131, wherein the oil pump assembly 193 includes a plunger 1931, an oil pump body 1932, an oil inlet mouth connected with the oil inlet tube 192, and an oil outlet mouth connected with the oil outlet tube 194. The plunger 1931 abuts against the eccentric wheel 133, and then rotational movement of the eccentric wheel 133 drives the plunger 1931 to move back and forth, and subsequently oil is sucked from the oil can 191 due to a differential pressure, and the oil passes through the oil inlet tube 192, the oil pump assembly 193, and finally is supplied to the saw chain 12 via the oil outlet tube 194. It is appreciated that the oil pump assembly is further provided with an elastic element, such as a spring, for supplying a restoring force for the plunger.

A gearbox 20 is provided in the housing 11 and includes a gearbox body 201 and a gearbox cover 202 mounted on the gearbox body 201, wherein the gear assembly 131 is mounted in the gearbox body 201. A positioning rib 2011 and a recess 2012 are formed on the gearbox body 201 for mounting and positioning the oil pump body 1932, so the oil pump assembly 193 may be fixedly mounted on the gearbox body 201. During use of the chain saw 10, the motor shaft rotates and brings the eccentric wheel 133 into rotation, the eccentric wheel 133 drives the plunger 1931 of the oil pump assembly 193 into reciprocating movement to pump oil, and the oil pump assembly 193 is fixed relative to the position of the eccentric wheel 133 to ensure stability during pumping the oil. A sealing ring 203 is provided at a position where the gearbox body 201 is assembled with the gearbox cover 202. In this way, it can be ensured that portions where the oil inlet mouth of the oil pump assembly 193 is connected to the oil inlet tube 192 and the oil outlet mouth is connected to the oil outlet tube 194 are also sealed in the gearbox 20 by the gearbox body 201 and the gearbox cover 202, that is, the positions of the whole oil pump assembly 193 where oil leakage might occur are all sealed in the gearbox 20. In practical use or storage, if oil leakage occurs at the oil inlet mouth of the oil pump, the oil outlet mouth, the plunger 1931 and the oil pump body 1932 or other locations with gaps, the leaked oil is sealed in the gearbox 20 and will not leak out of the machine. Meanwhile, the leaked oil serves as lubricant for the gear assembly 131 in the gearbox 20 and effectively lubricates and cools a decelerating gear train. As such, complexity of the structure and costs are almost not increased, but an excellent anti-oil leakage effect of the whole machine can be achieved. Meanwhile, waste of resources and environmental pollution caused by oil leakage of the chain saw out of the main machine are effectively prevented, stability and reliability of the whole oil pumping system is improved, and so much inconvenience caused by oil leakage to the user is solved.

Figure 4:
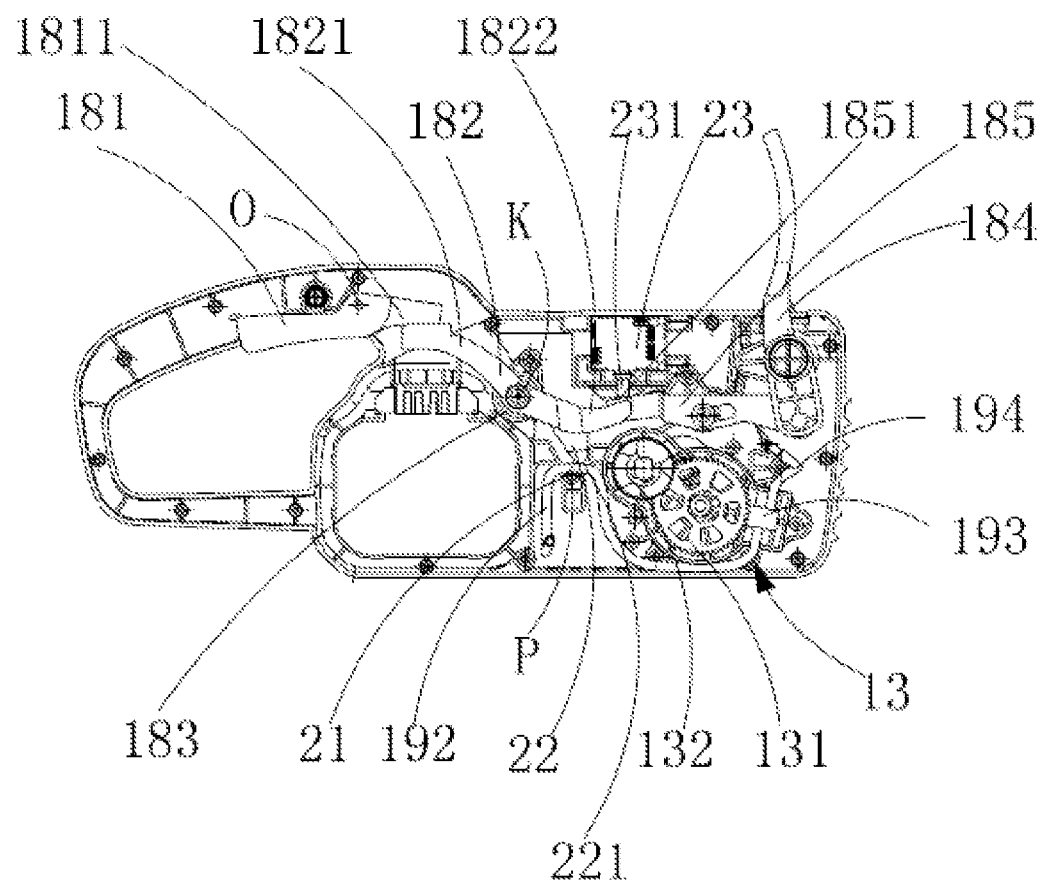
FIG. 4 is a sectional view of the chain saw of FIG. 1 in an on state.
Figure 5:
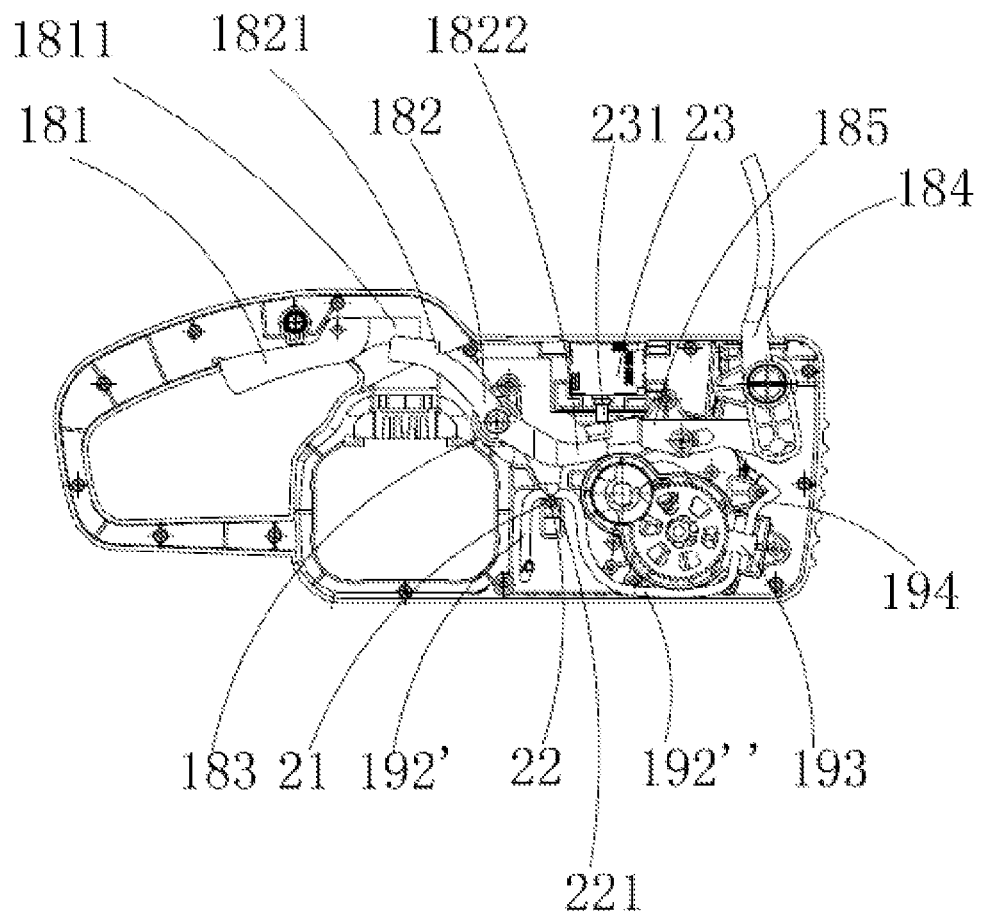
FIG. 5 is a sectional view of the chain saw of FIG. 1 in an off state.
Figure 6:
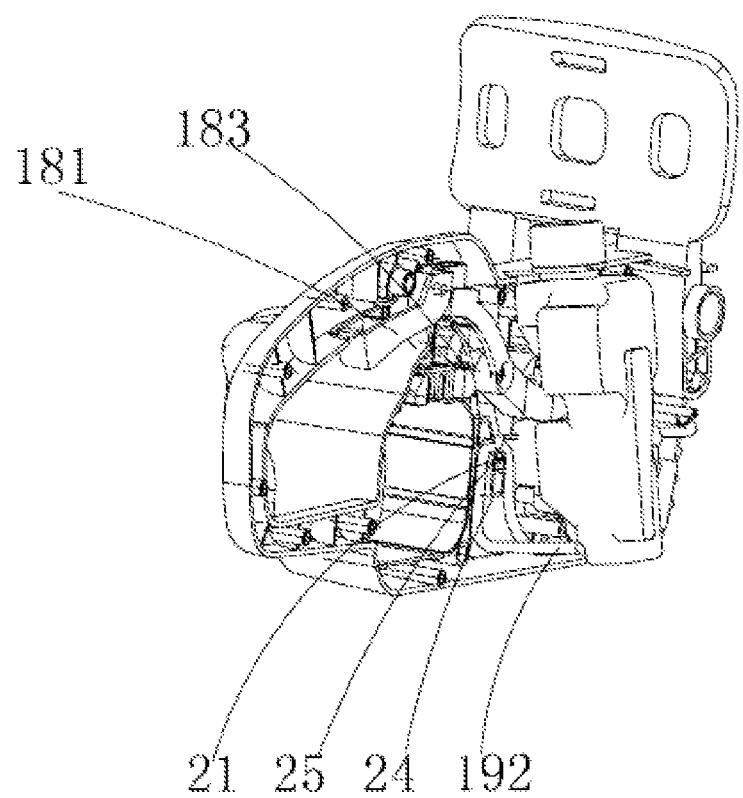
FIG. 6 is a partial structural view of the chain saw of FIG. 1.

Concurrently referring to FIGS. 4-6, the trigger linkage assembly 18 includes a switch trigger 181 rotatable about a pivot O relative to the housing 11, a trigger linkage rod 182 linked with the switch trigger 181, a torsion spring 183 provided on a pivot P on the trigger leakage rod 182, a brake plate 184, and a brake link 185 rotatably connected with the brake plate 184. The switch trigger 181 is connected with the brake link 185 via the trigger linkage rod 182, and finally triggers a switch push rod 231 which is provided on the switch 23 and used for activating the switch 23, to turn on the machine.

A first swing arm 1821 and a second swing arm 1822 are formed on both ends of the trigger linkage rod 182; a sway arm 1811 is formed on the switch trigger 181 to correspond to the first swing arm 1821 of the trigger linkage rod 182. When the switch trigger 181 is located at a triggered position, the sway arm 1811 on the switch trigger 181 rotates about the pivot O and contacts with the first swing arm 1821 on the trigger linkage rod 182 so that the trigger linkage rod rotates about a pivot K, whereupon the second swing arm 1822 on the trigger linkage rod 182 contacts with a protrusion 1851 on the brake link 185, and the protrusion 1851, pushed by rotation of the second swing arm 1822, triggers the switch push rod 231 and finally activates the switch 23. The torsion spring 183 is disposed at the position of the pivot K of the trigger linkage rod 182, and the second swing arm 1822 of the trigger linkage rod 182, biased by the torsion spring 183, is biased in a direction away from the protrusion 1851. Therefore, when the switch trigger 181 is at a closed position, the switch push rod 231 is released, whereupon the machine is switched off.

It may be appreciated that the brake structure in the present invention is employed upon quick brake when normal operation of the machine is confronted with special situations and is not requisite to the present invention. Therefore, it is also possible that the switch 23 is activated in a way that the second swing arm 1822 of the trigger linkage rod 182 directly contacts the switch push rod 231.

The present invention further discloses an oil circuit automatic opening and isolating structure operable together with the trigger linkage assembly 18. The structure temporally divides the chain saw oil supply system into two phases, namely a use phase and a storage phase, to perform on and off control of the oil circuit, desirably solves the oil leakage problem during storage of the chain saw and meanwhile does not affect the oil feeding effect upon use of the machine. The structure will be described in detail hereunder.

A pressing member 22 is disposed below the trigger linkage rod 182. The pressing member 22 may be either integrally formed with the trigger linkage rod 182 or an independent member assembled with the trigger linkage rod 182. On one side of the pressing member 22 facing towards the oil inlet tube 192 is provided with a pressing surface 221 which is configured to press or releasably contact a predetermined position (P) on the oil inlet tube 192. Furthermore, a support member 21 is disposed in the housing 11 below the pressing surface 221 of the pressing member 22. By means of the support member 21, the oil inlet tube 192 may be positioned below the pressing member 22. As such, at a switch-off position, biased by the torsion spring 183, the pressing surface 221 on the pressing member 22 contacts the oil inlet tube 192 and may press the oil inlet tube 192 against the support member 21 so that the oil inlet tube is in a close state at the position P, whereupon the oil circuit is isolated. It may be appreciated that in order to prevent the oil inlet tube 192 from damage whilst being pressed many times, the support member 21 is preferably a member made of elastic material such as rubber. In a preferred embodiment, a rubber pillar (not shown) is employed to achieve the support of the oil inlet tube 192. In the present embodiment, a support portion 24 is provided adjacent to the pressing member 22 in the housing 11. The support portion defines a positioning hole 25 and is fixed in a way that the rubber pillar is inserted into the positioning hole 25 formed on the support portion 24, whereupon the oil inlet tube 192 is positioned along a side of an outer circumferential surface of the rubber pillar opposite to the pressing surface 221 of the pressing member 22.

A specific operation procedure of the oil circuit automatic opening and isolating structure is described in detail as follows. As shown in FIG. 4, when the machine is turned on, the user presses the switch trigger 181, the switch trigger 181 rotates clockwise about the pivot O, the sway arm 1811 of the switch trigger 181 pushes the first swing arm 1821 on the trigger linkage rod 182 to rotate so that the trigger linkage rod 182, against a torsion action of the torsion spring 183, rotates counter-clockwise about the pivot K, and finally the second swing arm 1822 cooperates with the protrusion 1851 on the brake link 185 to trigger the switch 23. At this time, the machine is turned on and in a working state. The pressing surface 221 on the pressing member 22 gets out of contact with the point P of the oil inlet tube 192, the oil inlet tube 192 is in a free flow state and the oil, pumped by the oil pump assembly 19, is transmitted from the oil can 191 to the oil pump assembly 193, then transmitted from the oil pump assembly 193 to the oil outlet tube 194, and finally transmitted from the oil outlet tube 194 to an oil inlet of the guide plate to lubricate and cool the saw chain 12.

As shown in FIG. 5, when the machine needs to be turned off, the switch trigger 181 is released, the trigger linkage rod 182 rotates clockwise about the pivot K due to the torsion force of the torsion spring 183, and the switch trigger 181, pushed by the first swing arm 1821 of the trigger linkage rod 182, rotates counter-clockwise about the pivot O. It may be appreciated that a torsion spring is disposed at the pivot O of the switch trigger 181. In normal situations, the switch trigger 181 is biased toward the counter-clockwise direction. At this time, the second swing arm 1822 of the trigger linkage rod 182 gets out of contact with the switch push rod 231 provided on the switch 23, the switch 23 is disconnected and at this time the machine is in a turn-off state. The pressing member 22 contacts with the oil inlet tube 192 and presses the oil inlet tube 192 against the support member 21 so that the oil inlet tube 192 is in a closed state at the point P, whereupon the whole oil supply system 19 is divided into two portions, wherein the first portion includes the oil can 191 and partial oil inlet tube 192', and the second portion includes partial oil inlet tube 192", the oil pump assembly 193 and the oil outlet tube 194. In such state, an oil pressure in the oil can 191 cannot act upon respective nodes where the oil tubes 192, 194 are connected with the oil pump assembly 193 and upon gap locations of the oil pump assembly 193 where oil leakage might occur, so the oil is not apt to leak. By means of the above structure, when an operator turns on and uses the machine, the oil circuit is completely opened and communicated; when the machine is turned off or placed without use, the oil circuit is isolated, which plays a role of preventing oil leakage and meanwhile does not affect normal oil supply and lubrication when the machine is turned on.

In addition to the above embodiments, the trigger linkage rod 182 might not be used, and instead a pressing member is directly provided on the switch trigger 181. The pressing member may be either integrally formed with the switch trigger 18 or an independent member assembled with the switch trigger 18. At this time, the support member 21 is positioned above the pressing member. After the machine is turned off, a pressing surface on the pressing member presses the oil inlet tube 192 against the support member 21 at the point P, and thereby controls interruption of the oil circuit.

At this time, the switch is triggered in a way that the sway arm 181 on the switch trigger 18 is connected with the brake link 185 in the brake mechanism, or the switch is triggered directly via the sway arm 181 without using the brake mechanism.

It should be noted that the oil inlet tube 192 is made of an elastic material such as a modified PU and modified PE material which is deformable and capable of quickly restoring to the original shape after release of the pressing. Use of such material avoids the phenomenon that the oil inlet tube cannot restore to its original shape after release of the pressing since the oil inlet tube is pressed for a period of time, and which causes the oil circuit to be interrupted when the machine is turned on.

The oil anti-leakage structure and the oil pump sealing structure as disclosed in the present invention are not limited to the content stated in the above embodiments and the structures represented by the figures. Obvious changes, substitutions or modifications to shapes and positions of parts on the basis of the present invention all fall within the protection scope as defined by the present invention.

What is claimed is:

1. A chain saw, comprising:
   a housing;
   a saw chain;
   an oil supply system disposed in the housing, the oil supply system comprising an oil can and an oil pump assembly for supplying oil to the saw chain connected with the oil can via an oil inlet tube;
   a switch for turning on and off the chain saw;
   a trigger linkage assembly mounted in the housing for controlling the switch, the trigger linkage assembly comprising a switch trigger, a trigger linkage rod driven by the switch trigger, and a torsion spring disposed on a pivot point of the trigger linkage rod, wherein the trigger linkage rod is rotatable relative to the housing, the switch trigger is capable of triggering the switch via the trigger linkage rod, and the trigger linkage rod is biased by the torsion spring in a direction away from a direction of triggering the switch; and
   a pressing member having a pressing surface positioned on the trigger linkage rod wherein the pressing member contacts the oil net tube to compress the oil net tube when the pressing member is located at a first position to isolate an oil circuit of the oil supply system when the switch trigger is not activated and, when the switch trigger is activated, the pressing member is driven by the trigger linkage assembly to a second position to release the oil net tube so that the oil circuit of the oil supply system is allowed to flow therethough,
   wherein the trigger linkage rod is driven by the switch trigger and is rotatable relative to the housing, and the torsion spring is disposed on the pivot point of the trigger linkage rod, wherein the switch trigger is pivotable about the pivot point to a triggering position where the trigger linkage rod triggers the switch, and the trigger linkage rod is biased by the torsion spring in a direction away from the triggering position,
   wherein the trigger linkage rod comprises a first swing arm and a second swing arm respectively formed at two ends thereof and a sway arm formed on the switch trigger, the sway arm of the switch trigger driving the first swing arm to turn the trigger linkage rod and thereby drive the second swing arm to rotate and trigger the switch, and
   wherein the chain saw further comprises a brake plate and a brake link rotatabiy connected with the brake plate, wherein the brake link comprises a protrusion directly contacting with the switch, and the switch trigger is capable of driving the protrusion on the brake link to trigger the switch.

2. The chain saw according to claim 1, wherein the first swing arm and the second swing arm respectively form at two ends thereof and the sway arm forms on the switch trigger where the sway arm of the switch trigger is capable of driving the first swing arm to turn the trigger linkage rod and thereby drive the second swing arm to rotate and trigger the switch.

3. The chain saw according to claim 2, wherein the chain saw further comprises a support member mounted on the housing, the support member being located on a side of the pressing surface of the pressing member, and the oil inlet tube being positioned along the support member, a support portion is disposed at a location of the housing adjacent to the pressing member, the support portion defines a positioning hole, and the support member is mounted in the positioning hole.

4. The chain saw according to claim 3, further comprising a gearbox mounted in the housing and a gearbox body and a gearbox cover mounted on the gearbox body, wherein the oil pump assembly is disposed in the gearbox body, and a location where the gearbox body engages the gearbox cover is sealed by a sealing ring.

5. The chain saw according to claim 4, wherein the gearbox body comprises a positioning rib and a recess for mounting the oil pump assembly.

6. The chain saw according to claim 4, wherein the oil supply system further comprises an oil outlet tube connected with the oil pump assembly to supply oil to the saw chain.

7. The chain saw according to claim 4, wherein the oil pump assembly comprises a plunger, an oil pump body, an oil inlet mouth connected with the oil inlet tube, and an oil outlet mouth connected with the oil outlet tube, wherein a portion where the oil inlet mouth is connected with the oil inlet tube, a portion where the oil outlet mouth is connected with the oil outlet tube, the plunger and the oil pump body all are sealed in the gearbox.

8. A chain saw, comprising:
a housing;
a saw chain;
an oil supply system disposed in the housing, the oil supply system comprising an oil can and an oil pump assembly for supplying oil to the saw chain connected with the oil can via an oil inlet tube;
a trigger linkage assembly mounted in the housing, the trigger linkage assembly comprising a switch trigger and a trigger linkage rod;
a switch controlled by the trigger linkage assembly, the switch for turning on and off the chain saw; and
a pressing member having a pressing surface positioned on the trigger linkage rod wherein the pressing member operably contacts the oil inlet tube to compress the oil inlet tube when the pressing member is at a first position, the pressing member driven by the trigger linkage rod, when the switch trigger is not activated, the pressing member being located at the first position and being capable of pressing the oil inlet tube tightly to isolate an oil circuit of the oil supply system, and when the switch trigger is pressed down, the pressing member being able to be driven by the trigger linkage assembly to a second position to release the pressing and allow the oil inlet tube to expand so that oil in the oil circuit of the oil supply system is allowed to flow through the oil inlet tube,
wherein the trigger linkage rod is driven by the switch trigger and is rotatable relative to the housing, and a torsion spring is disposed on a pivot point of the trigger linkage rod, wherein the switch trigger is pivotable about the pivot point to a triggering position where the trigger linkage rod triggers the switch, and the trigger linkage rod is biased by the torsion spring in a direction away from the triggering position,
wherein the trigger linkage rod comprises a first swing arm and a second swing arm respectively formed at two ends thereof and a sway arm formed on the switch trigger, the sway arm of the switch trigger driving the first swing arm to turn the trigger linkage rod and thereby drive the second swing arm to rotate and trigger the switch, and
wherein the chain saw further comprises a brake plate and a brake link rotatably connected with the brake plate, wherein the brake link comprises a protrusion directly contacting with the switch, and the switch trigger is capable of driving the protrusion on the brake link via the second swing arm on the trigger linkage rod to trigger the switch.

9. The chain saw according to claim 8, wherein the pressing member is positioned on the trigger linkage rod, the pressing surface is formed on one side of the pressing member facing towards the oil inlet tube and is configured to press a predetermined position on the oil inlet tube when the switch trigger is not triggered.

10. The chain saw according to claim 9, wherein the chain saw further comprises a support member mounted on the housing, the support member is located on the side of the pressing surface of the pressing member, and the oil inlet tube is positioned along the support member.

11. The chain saw according to claim 10, wherein the oil inlet tube is made of an elastic material and the support member is a rubber member, a support portion is disposed at a location of the housing adjacent to the pressing member, the support portion defines a positioning hole, and the support member is mounted in the positioning hole.

12. The chain saw according to claim 8, further comprising a gearbox mounted in the housing and a gearbox body and a gearbox cover mounted on the gearbox body, wherein the oil pump assembly is disposed in the gearbox body, and a location where the gearbox body engages the gearbox cover is sealed by a sealing ring.

13. The chain saw according to claim 12, wherein the gearbox body comprises a positioning rib and a recess for mounting the oil pump assembly.

14. The chain saw according to claim 12, wherein the oil supply system further comprises an oil outlet tube connected with the oil pump assembly to supply oil to the saw chain.

15. The chain saw according to claim 14, wherein the oil pump assembly comprises a plunger, an oil pump body, an oil inlet mouth connected with the oil inlet tube, and an oil outlet mouth connected with the oil outlet tube, wherein a portion where the oil inlet mouth is connected with the oil inlet tube, a portion where the oil outlet mouth is connected with the oil outlet tube, the plunger and the oil pump body all are sealed in the gearbox.

* * * * *